US011352128B2

(12) United States Patent
Lawson

(10) Patent No.: US 11,352,128 B2
(45) Date of Patent: Jun. 7, 2022

(54) NUT LOCKING ASSEMBLY

(71) Applicant: GOODRICH CORPORATION, Charlotte, NC (US)

(72) Inventor: David Lawson, Hamilton (CA)

(73) Assignee: GOODRICH CORPORATION, Charlotte, NC (US)

(*) Notice: Subject to any disclaimer, the term of this patent is extended or adjusted under 35 U.S.C. 154(b) by 363 days.

(21) Appl. No.: 16/529,558

(22) Filed: Aug. 1, 2019

(65) Prior Publication Data

US 2021/0031905 A1 Feb. 4, 2021

(51) Int. Cl.
*F16B 39/28* (2006.01)
*B64C 25/20* (2006.01)
*B64C 25/26* (2006.01)

(52) U.S. Cl.
CPC .............. *B64C 25/20* (2013.01); *B64C 25/26* (2013.01); *F16B 39/28* (2013.01)

(58) Field of Classification Search
CPC .......... F16B 39/08; F16B 39/10; F16B 39/28; B64C 25/20; B64C 25/26
USPC ......................................... 411/103, 106, 109
See application file for complete search history.

(56) References Cited

U.S. PATENT DOCUMENTS

| | | | | |
|---|---|---|---|---|
| 4,534,101 A * | 8/1985 | Rosan, Jr. | ............... | F16B 39/10 29/258 |
| 5,618,143 A * | 4/1997 | Cronin, II | ............... | B25B 13/48 411/220 |
| 5,674,034 A * | 10/1997 | Bennett | ................... | F16B 39/10 411/120 |
| 5,772,373 A * | 6/1998 | Cronin, II | ............. | F16D 41/061 411/120 |
| 6,095,735 A * | 8/2000 | Weinstein | ............... | F16B 39/10 411/197 |
| 8,540,470 B2 | 9/2013 | Dillon et al. | | |
| 8,920,129 B2 | 12/2014 | Harbin et al. | | |
| 10,156,152 B2 | 12/2018 | Accary et al. | | |
| 2006/0029485 A1* | 2/2006 | Weinstein | ............... | F16B 39/10 411/121 |
| 2009/0245969 A1* | 10/2009 | White | ..................... | F16C 25/06 411/215 |
| 2011/0097174 A1 | 4/2011 | Varden | | |
| 2011/0291468 A1* | 12/2011 | Rieger | .................... | F16C 25/06 301/105.1 |
| 2012/0051870 A1 | 3/2012 | Cormier | | |

(Continued)

FOREIGN PATENT DOCUMENTS

FR 2952146 5/2011

OTHER PUBLICATIONS

European Patent Office, European Search Report dated Jun. 17, 2020 in Application No. 19215351.8.

*Primary Examiner* — Roberta S Delisle
(74) *Attorney, Agent, or Firm* — Snell & Wilmer L.L.P.

(57) ABSTRACT

A nut locking assembly may comprise a pin, a nut, and a lock ring. The pin may include an outer diameter threaded surface and a plurality of radially inward extending grooves formed between the outer diameter threaded surface and an end of the pin. The nut may include an inner diameter threaded surface and a plurality of radially outward extending grooves formed between the inner diameter threaded surface and an axial end of the nut. The lock ring may include a plurality of outer diameter protrusions and a plurality of inner diameter protrusions.

20 Claims, 9 Drawing Sheets

(56) References Cited

U.S. PATENT DOCUMENTS

2014/0301803 A1\* 10/2014 Haas .................. F16D 1/02
411/103

\* cited by examiner

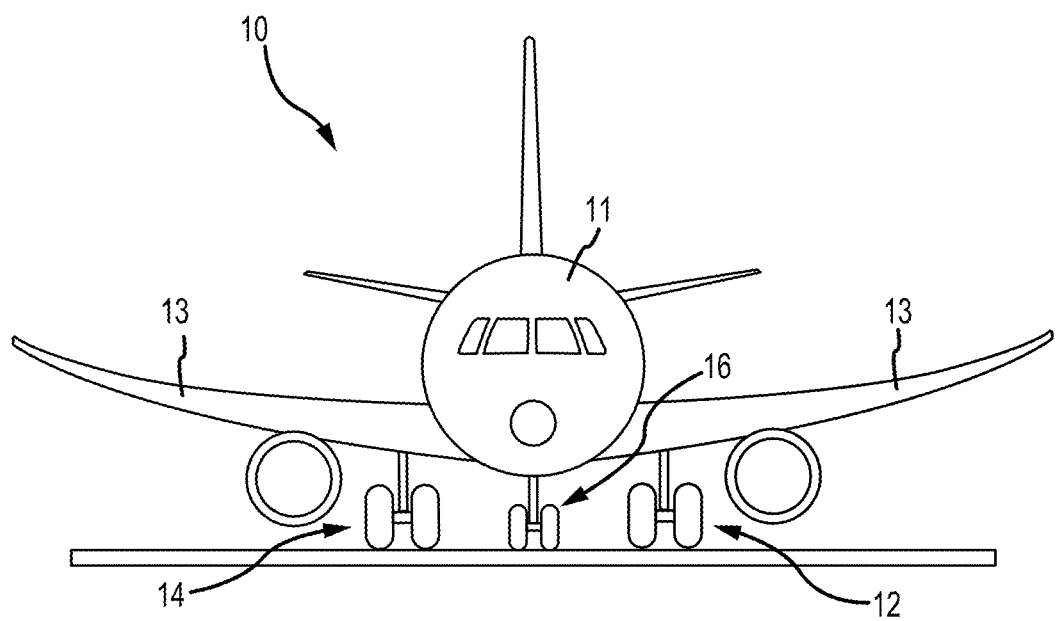
FIG.1
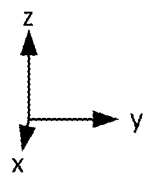

NUT LOCKING ASSEMBLY

FIELD

The present disclosure relates to a nut locking assembly, and more particularly, to a nut locking assembly which may be employed in landing gear joints.

BACKGROUND

Aircraft generally include landing gear assemblies that support the aircraft during taxi, take-off, and landing. The landing gear assemblies include various joints wherein two or more landing gear components are coupled to one another. The joints may include a pin located through the landing gear components with a nut coupled to the pin. Landing gear joints that experience axial loads may be susceptible to rotation (i.e., decoupling) of the nut relative to the pin.

SUMMARY

A nut locking assembly is disclosed herein. In accordance with various embodiments, the nut locking assembly may comprise a pin, a nut, and a lock ring. The pin may include an outer diameter threaded surface and a plurality of radially inward extending grooves formed between the outer diameter threaded surface and an end of the pin. The nut may include an inner diameter threaded surface and a plurality of radially outward extending grooves formed between the inner diameter threaded surface and an axial end of the nut. The lock ring may include a plurality of outer diameter protrusions and a plurality of inner diameter protrusions.

In various embodiments, a retaining ring may be located between the lock ring and the end of the pin. In various embodiments, the nut may define a retaining ring channel and the retaining ring may be located in the retaining ring channel.

In various embodiments, each outer diameter protrusion of the plurality of outer diameter protrusions may include a radially outward surface and a side surface extending from the radially outward surface to an outer circumferential surface of the lock ring. An angle of the side surface relative to the radially outward surface may be between approximately 90° and approximately 150°. In various embodiments, the angle of the side surface relative to the radially outward surface may be approximately 120°.

In various embodiments, a first gap between a radially outward surface of a first outer diameter protrusion of the lock ring and a floor of a first nut groove may be greater than a second gap between a radially outward surface of a second outer diameter protrusion of the lock ring and a floor of a second nut groove. The plurality of outer diameter protrusions may include the first outer diameter protrusion and the second outer diameter protrusion. The plurality of radially outward extending grooves may include the first nut groove and the second nut groove.

In various embodiments, an axial thickness of the first outer diameter protrusion may be less than an axial thickness of the second outer diameter protrusion. In various embodiments, the lock ring may include a greater number of outer diameter protrusions as compared to inner diameter protrusions.

A landing gear assembly is also disclosed herein. In accordance with various embodiments, the landing gear assembly may comprise a first component including a lug, a second component coupled to the first component, and a nut locking assembly coupling the second component to the first component. The nut locking assembly may comprise a pin, a nut, and a lock ring. The pin may be located through the lug and the second component. The pin may include an outer diameter threaded surface and a plurality of radially inward extending grooves formed between the outer diameter threaded surface and an end of the pin. The nut may include an inner diameter threaded surface engaged with the outer diameter threaded surface of the pin. The nut may define a plurality of radially outward extending grooves formed between the inner diameter threaded surface and an axial end of the nut. The lock ring may be located between the nut and the pin. The lock ring may include a plurality of outer diameter protrusions and a plurality of inner diameter protrusions.

In various embodiments, the nut locking assembly may further comprise a retaining ring located between the lock ring and the end of the pin. In various embodiments, an outer circumferential surface of the nut may define a retaining ring channel. The retaining ring may be located in the retaining ring channel.

In various embodiments, the retaining ring channel may include a first axially oriented wall and second axially oriented wall. The second axially oriented wall may be oriented toward the first axially oriented wall. An axial thickness of the lock ring may be greater than an axial length of the outer circumferential surface of the nut. The axial length of the outer circumferential surface being measured from the first axially oriented wall of the retaining ring channel.

In various embodiments, each outer diameter protrusion of the plurality of outer diameter protrusions may include a radially outward surface and a side surface extending from the radially outward surface to an outer circumferential surface of the lock ring. An angle of the side surface relative to the radially outward surface may be approximately 120°.

In various embodiments, each inner diameter protrusion of the plurality of inner diameter protrusions may include a radially inward surface and a side surface extending from the radially inward surface to an inner circumferential surface of the lock ring. An angle of the side surface relative to the radially inward surface may be approximately 120°.

In various embodiments, an axial thickness of a first outer diameter protrusion of the lock ring may be less than an axial thickness of a second outer diameter protrusion of the lock ring. The plurality of outer diameter protrusions may include the first outer diameter protrusion and the second outer diameter protrusion.

In various embodiments, a first gap between a radially outward surface of the first outer diameter protrusion and a floor of a first nut groove may be greater than a second gap between a radially outward surface of the second outer diameter protrusion and a floor of a second nut groove. The plurality of radially outward extending grooves may include the first nut groove and the second nut groove.

In various embodiments, the lock ring may include a greater number of outer diameter protrusions as compared to inner diameter protrusions. In various embodiments, the second component may pivot relative to the first component.

A method of coupling landing gear components is also disclosed herein. In accordance with various embodiments, the method may comprise the steps of locating a pin through a first landing gear component and a second landing component such that an outer diameter threaded surface of the pin extends axially from a first lug of the first landing gear component and a head of the pin abuts a second lug of the first landing gear component, coupling a nut to the pin by forming a threaded engagement between an inner diameter threaded surface of the nut and the outer diameter threaded surface of the pin, inserting a lock ring between the nut and the pin, and locating a retaining ring in a retaining ring channel defined by the pin. In accordance with various embodiments, the lock ring may include a plurality of outer diameter protrusions and a plurality of inner diameter protrusions.

In various embodiments, the nut may include a plurality of radially outward extending grooves and the pin may include a plurality of radially inward extending grooves, and the step of inserting the lock ring between the nut and the pin may comprise rotating the nut about the pin until a positioning of the plurality of radially outward extending grooves relative to the plurality of radially inward extending grooves corresponds to a positioning of the plurality of outer diameter protrusions relative to the plurality of inner diameter protrusions, and translating the lock ring axially along the pin until the plurality of outer diameter protrusions are located in the radially outward extending grooves and the plurality of inner diameter protrusions are located in the radially inward extending grooves.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 1 illustrates an aircraft, in accordance with various embodiments;

Figure 2:
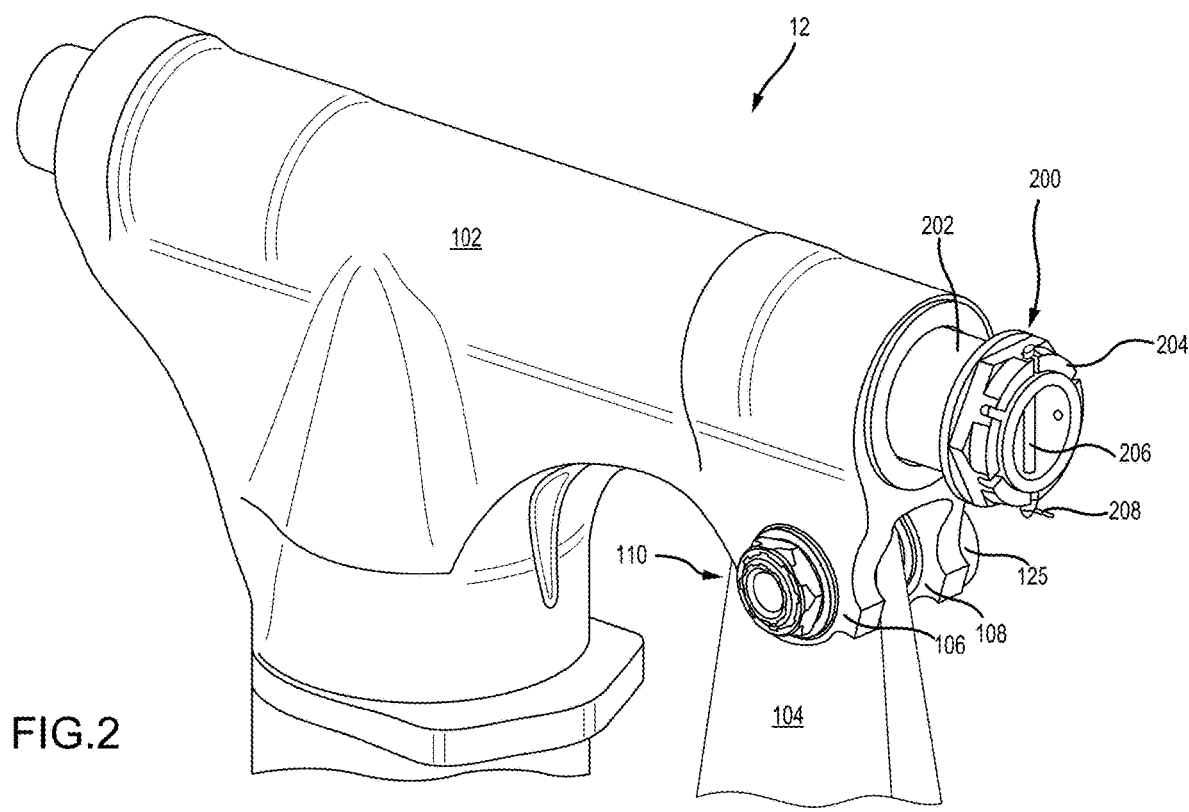
FIG. 2 illustrates a portion of a landing gear including a nut locking assembly, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Surface shading and/or cross hatching lines may be used throughout the figures to denote different parts but not necessarily to denote the same or different materials. Throughout the present disclosure, like reference numbers denote like elements. Accordingly, elements with like element numbering may be shown in the figures, but may not be necessarily repeated herein for the sake of clarity.

A first component that is "radially outward" of a second component means that the first component is positioned at a greater distance away from a common axis of the first and second components as compared to the second component. A first component that is "radially inward" of a second component means that the first component is positioned closer to a common axis of the first and second components than the second component.

A nut locking assembly is disclosed herein. In accordance with various embodiments, the nut locking assembly may include a nut configured to receive a lock ring. The lock ring may secure the nut to a pin of the nut locking assembly such that rotation of the nut relative to the pin is reduced and/or prevented. In various embodiments, the nut locking assembly may secure a first landing gear component to a second landing gear component. Nut locking assemblies, as described herein, may be employed to secure pins which experience increased axial loading, as the lock ring of the disclosed nut locking assembly is able to withstand a greater amount of relative torque between the pin and the nut, as compared to, for example, nut assemblies that employ a cross bolt located through the nut and the pin. The disclosed nut locking assembly with lock ring may also allow for reduced pin length and/or may be associated with a nut having a decreased axial length, as compared to, for example, nut assemblies that employ a cross bolt located through the nut and the pin.

While the disclosed nut locking assembly may find particular use in connection with landing gear joints, various aspects of the disclosed embodiments may be adapted for performance in a variety of other joints and components. As such, numerous applications of the present disclosure may be realized.

With reference to FIG. 1, an aircraft 10 is illustrated, in accordance with various embodiments. Aircraft 10 includes a fuselage 11 and wings 13. Aircraft 10 includes landing gear such as left landing gear assembly 12, right landing gear assembly 14, and nose landing gear assembly 16 (referred to herein collectively as landing gear assemblies 12, 14, 16). Landing gear assemblies 12, 14, 16 may generally support aircraft 10, when aircraft 10 is not flying, allowing aircraft 10 to taxi, take-off, and landing without damage. Landing gear assemblies 12, 14, 16 may each include various shock and strut assemblies with one or more wheels attached thereto. Landing gear assemblies 12, 14, 16 may each be configured to translate between a landing gear down position, wherein the landing gear assemblies extend from wings 13 and/or fuselage 11 to support aircraft 10, and a landing gear up position, wherein the landing gear assemblies are located within wings 13 and/or fuselage 11 of aircraft 10. For example, during taxiing, take-off, and landing, landing gear assemblies 12, 14, 16 may be in the landing gear down position. After take-off, landing gear assemblies 12, 14, 16 may be translated to the landing gear up position. Prior to landing, landing gear assemblies 12, 14, 16 may be translated to the landing gear down position to support aircraft 10 during landing.

Referring to FIG. 2, and with continued reference to FIG. 1, a portion of left landing gear assembly 12 is illustrated, in accordance with various embodiments. Left landing gear assembly 112 includes a first landing gear component 102 and a second landing gear component 104. First and second landing gear components 102, 104 may comprise struts, shock strut cylinders, shock struts, or any other landing gear component. First landing gear component 102 includes one or more lugs, such as first lug 106 and second lug 108. In accordance with various embodiments, a nut locking assembly 110 couples second landing gear component 104 to first landing gear component 102. While FIGS. 2, 3, 4, 5, 6, and 7 illustrate components of left landing gear assembly 12, it should be understood that right landing gear assembly 14 and nose landing gear assembly 16 may include the elements and functionalities as described herein with respect to left landing gear assembly 12.

In various embodiments, nut locking assembly 110 may form a dynamic joint that allows second landing gear component 104 to pivot, or rotate, relative to first landing gear component 102. As used herein, a "dynamic joint" refers to a coupling between a first component and a second component, wherein the first component and/or the second component is/are configured to pivot about the dynamic joint such that an angle of the first component relative to the second components changes. In various embodiments, nut locking assembly 110 may form static joint, wherein first and second landing gear components 102, 104 do not rotate relative to one another. As used herein, a "static joint" refers to a coupling between a first component and a second component, wherein the first and second component do not pivot about the joint and the angle of the first component relative to the second component remains relatively constant. While components coupled via a static joint do not rotate relative to one another, it is contemplated and understood that the components may exhibit a degree of motion due to structural deflections of the joint generated by loads applied to the landing gear assembly.

Figure 3:
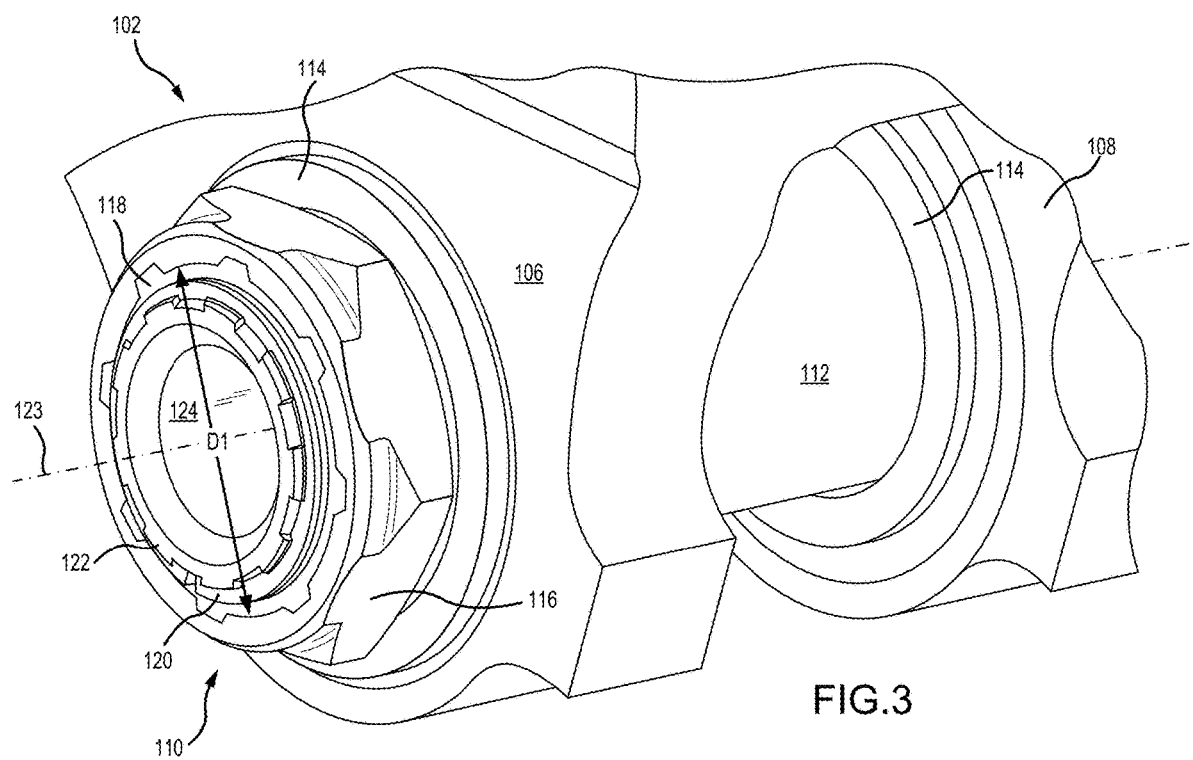
FIG. 3 illustrates a nut locking assembly, in accordance with various embodiments.

With reference to FIG. 3, additional details of nut locking assembly 110 are illustrated, in accordance with various embodiments. In FIG. 3, second landing gear component 104 has been removed to more clearly illustrate components of nut locking assembly 110. Nut locking assembly 110 includes a pin 112. Pin 112 is located through first and second lugs 106, 108 of first landing gear component 102. Second landing gear component 104 (FIG. 2) may be coupled to first landing gear component 102 by locating pin 112 through first and second lugs 106, 108 and through an opening defined by second landing gear component 104. In various embodiments one or more bushings 114 may be located between pin 112 and first and second lugs 106, 108.

Nut locking assembly 110 further includes a nut 116, a lock ring 118, and a retaining ring 120. Nut 116, lock ring 118, and retaining ring 120 may be coupled to pin 112. Nut 116, lock ring 118, and retaining ring 120 may be located proximate a first end 122 of pin 112. First end 122 of pin 112 may be axially opposite a head (or second end) 125 of pin 112, with momentary reference to FIG. 2. As used herein, the terms "axial" and "axially" refer to directions parallel to an axis of rotation 123 of nut 116. As used herein, the terms "radial" and "radially" refer to directions toward and away from axis of rotation 123. As used herein, the terms "circumferential" and "circumferentially" refer to directions about axis of rotation 123.

In various embodiments, first end 122 of pin 112 may be hollow. Stated differently, an inner circumferential surface 124 of pin 112 may be exposed at first end 122. In various embodiments, first end 122 and inner circumferential surface 124 may be configured to receive a pin cap. Locating a pin cap over first end 122 of pin 112 may reduce noise, as the pin cap covers inner circumferential surface 124, thereby preventing or reducing noise which may be generated by air flowing over an exposed inner circumferential surface 124.

Figure 4:
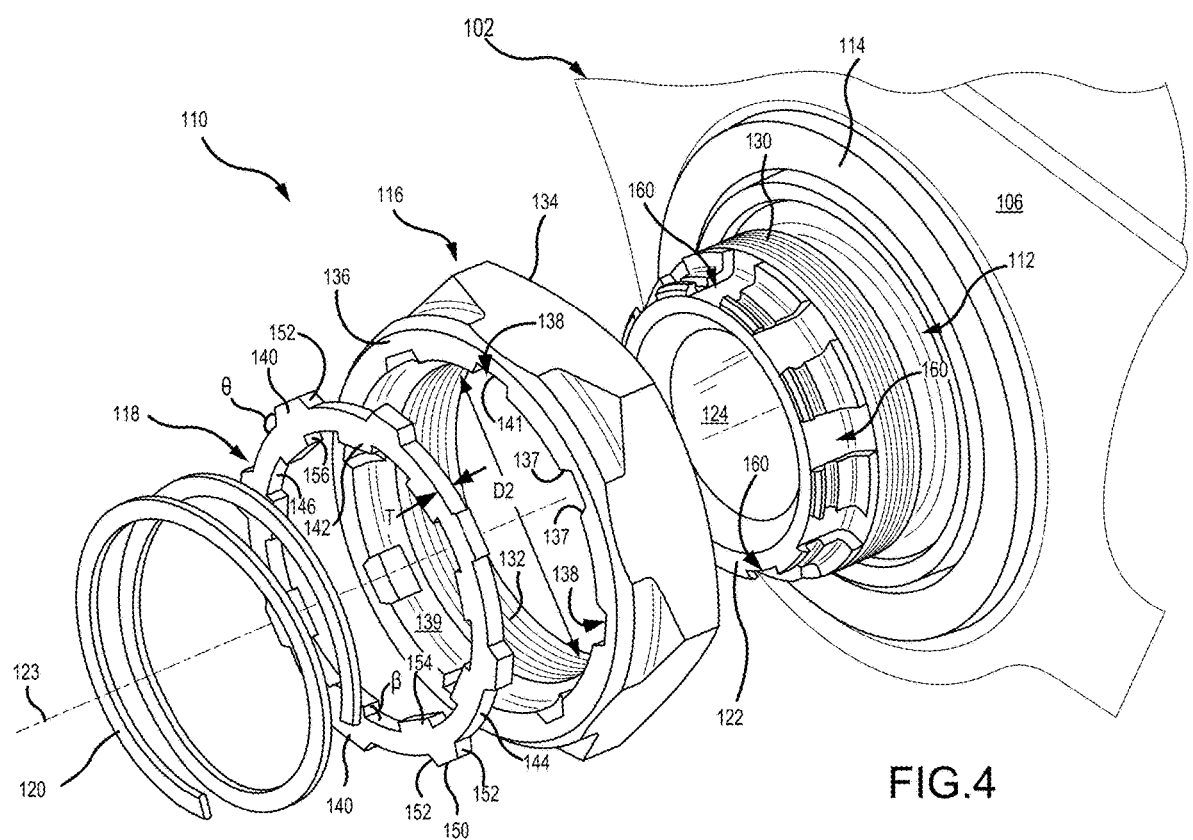
FIG. 4 illustrates an assembly view of a nut locking assembly, in accordance with various embodiments.

With reference to FIG. 4, an exploded view of nut locking assembly 110 is illustrated. In accordance with various embodiments, pin 112 defines an out diameter (OD) threaded surface 130. Nut 116 defines an inner diameter (ID) threaded surface 132. Nut 116 may be coupled to pin 112 by threaded engagement between OD threaded surface 130 and ID threaded surface 132. ID threaded surface 132 may be formed proximate a first axial end 134 of nut 116. A plurality of radially outward extending grooves 138 may be formed at a second axial end 136 of nut 116. Second axial end 136 of nut 116 is axially opposite first axial end 134 of nut 116. Radially outward extending grooves 138 (referred to herein as nut grooves 138) may extend axially from second axial end 136 of nut 116 toward ID threaded surface 132 and first axial end 134 of nut 116. Nut grooves 138 may be formed in an inner circumferential surface 139 of nut 116. Inner circumferential surface 139 may be oriented radially inward (i.e., towards axis of rotation 123. In various embodiments, a diameter D1 (shown in FIG. 3) of nut 116, as measured at inner circumferential surface 139, may be greater than a diameter D2 of nut 116, as measured at the radially inward most portion of ID threaded surface 132.

In accordance with various embodiments, lock ring 118 includes OD protrusions 140 and ID protrusions 142. OD protrusions 140 extend radially outward from an outer circumferential surface 144 of lock ring 118. ID protrusions 142 extend radially inward from an inner circumferential surface 146 of lock ring 118. OD protrusions 140 include (i.e., are defined by) a radially outward surface 150 and a pair of side surfaces 152 extending between radially outward surface 150 and outer circumferential surface 144. In various embodiments, an angle theta (θ) of side surface 152 relative to outer circumferential surface 144 may be between approximately 90° and approximately 150°. In various embodiments, angle theta (θ) may be approximately 120°. As used in the previous context, "approximately" means±5°. Nut grooves 138 are configured to receive OD protrusions 140. In various embodiments, the axial length of nut grooves 138 is greater than or equal to an axial thickness T of lock ring 118. In various embodiments, the angle of the sidewalls 137 of nut grooves 138 relative to floor 141 of nut grooves 138 is approximately equal to the theta (θ). As used in the previous context, "approximately" means±2°. In various embodiments, a pitch (or circumferential distance) between circumferentially adjacent nut grooves 138 is equal to a pitch (or circumferential distance) between circumferentially adjacent OD protrusions 140. In various embodiments, nut grooves 138 and OD protrusions 140 may be formed having a standardized tooth profile, for example, having a tooth profile that complies with standards set by, for example, the American Nation Standard Institute (ANSI) and/or the International Organization for Standardization (ISO).

ID protrusions 142 include (i.e., are defined by) a radially inward surface 154 and a pair of side surfaces 156 extending between radially inward surface 154 and inner circumferential surface 146. In various embodiments, an angle beta (β) of side surface 156 relative to inner circumferential surface 146 may be between approximately 90° and approximately 150°. In various embodiments, angle beta (β) may be approximately 120°. As used in the previous context only, "approximately" means±5°. ID protrusions 142 are configured to be received by radially inward extending grooves 160 formed in pin 112.

Figure 5:
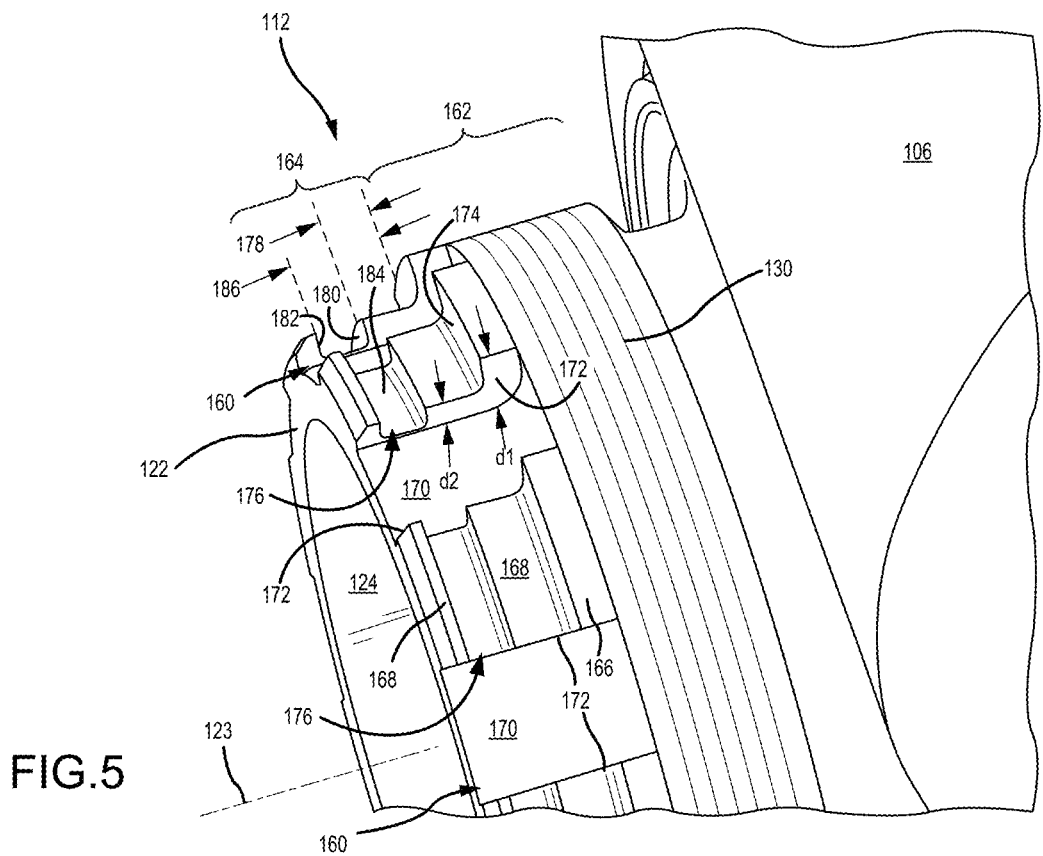
FIG. 5 illustrates a threaded end of a pin of a nut locking assembly, in accordance with various embodiments.

With reference to FIG. 5, additional details of pin 112 are illustrated. Radially inward extending grooves 160 (referred to herein as pin grooves 160) are formed proximate first end 122 of pin 112. Pin grooves 160 may extend axially from first end 122 of pin 112 toward OD threaded surface 130. In various embodiments, pin 112 may include a first portion 162 and a second portion 164. First portion 162 may have a first outer circumferential surface 166. Second portion may have a second outer circumferential surface 168. First outer circumferential surface 166 may define the radially outward most portions of OD threaded surface 130. Stated differentially, OD threaded surface 130 may be formed in first outer circumferential surface 166. Second outer circumferential surface 168 is located axially between an axially oriented surface 174 of first portion 162 and first end 122 of pin 112. Axially oriented surface 174 may extend from first outer circumferential surface 166 to second outer circumferential surface 168. Second outer circumferential surface 168 is radially inward of first outer circumferential surface 166. In this regard, a diameter of pin 112 at first outer circumferential surface 166 is greater than a diameter of pin 112 at second outer circumferential surface 168. Pin grooves 160 may each be defined by a floor 170 and a pair of sidewalls 172. In various embodiments, the angle of sidewalls 172 relative to floor 170 is approximately equal to the angle beta (β), with momentary reference to FIG. 4. As used in the previous context, "approximately" means±2°. In various embodiments, a pitch (or circumferential distance) between circumferentially adjacent pin grooves 160 is equal to a pitch (or circumferential distance) between circumferentially adjacent ID protrusions 142. In various embodiments, pin grooves 160 and ID protrusions 142 may be formed having a standardized tooth profile, for example, having a tooth profile that complies with standards set by, for example, the ANS and/or the ISO.

Pin grooves 160 may be formed in second portion 164 and, at least, partially in first portion 162. For example, pin grooves 160 may include a first radial depth d1 in first portion 162 and a second radial depth d2 in second portion 164. First radial depth d1 is measured between floor 170 of pin groove 160 and first outer circumferential surface 166. Second radial depth d2 is measured between floor 170 of pin groove 160 and second outer circumferential surface 168.

In accordance with various embodiments, a retaining ring channel 176 may be formed in (i.e., defined by) pin 112. Retaining ring channel 176 may be formed in second outer circumferential surface 168. Stated differently, retaining ring channel 176 may extend radially inward from second outer circumferential surface 168. Retaining ring channel 176 extends circumferentially between adjacent pin grooves 160. Retaining ring channel 176 includes a first axially oriented wall 180 and a second axially oriented wall 182. First axially oriented wall 180 is oriented generally toward second axially oriented wall 182. First and second axially oriented walls 180, 182 extend from a floor 184 of retaining ring channel 176 to second outer circumferential surface 168. Retaining ring channel 176 is configured to receive retaining ring 120, with momentary reference to FIG. 4.

In various embodiments, axial thickness T of lock ring 118 (with momentary reference to FIG. 4) and an axial length 178 of second outer circumferential surface 168, as measured between first axially oriented wall 180 of retaining ring channel 176 and axially oriented surface 174, are configured such that, when nut 116 and lock ring 118 are coupled to pin 112, retaining ring 120 may be located in retaining ring channel 176 (i.e., retaining ring 120 may be located axially between lock ring 118 and second axially oriented wall 182 of retaining ring channel 176). In various embodiments, axial thickness T of lock ring 118 is greater than axial length 178 of second outer circumferential surface 168 and less than an axial length 186 extending from second axially oriented wall 182 of retaining ring channel 176 to axially oriented surface 174, thereby causing lock ring 118 to partially overlap retaining ring channel 176 in a radially outward direction.

Figure 6:
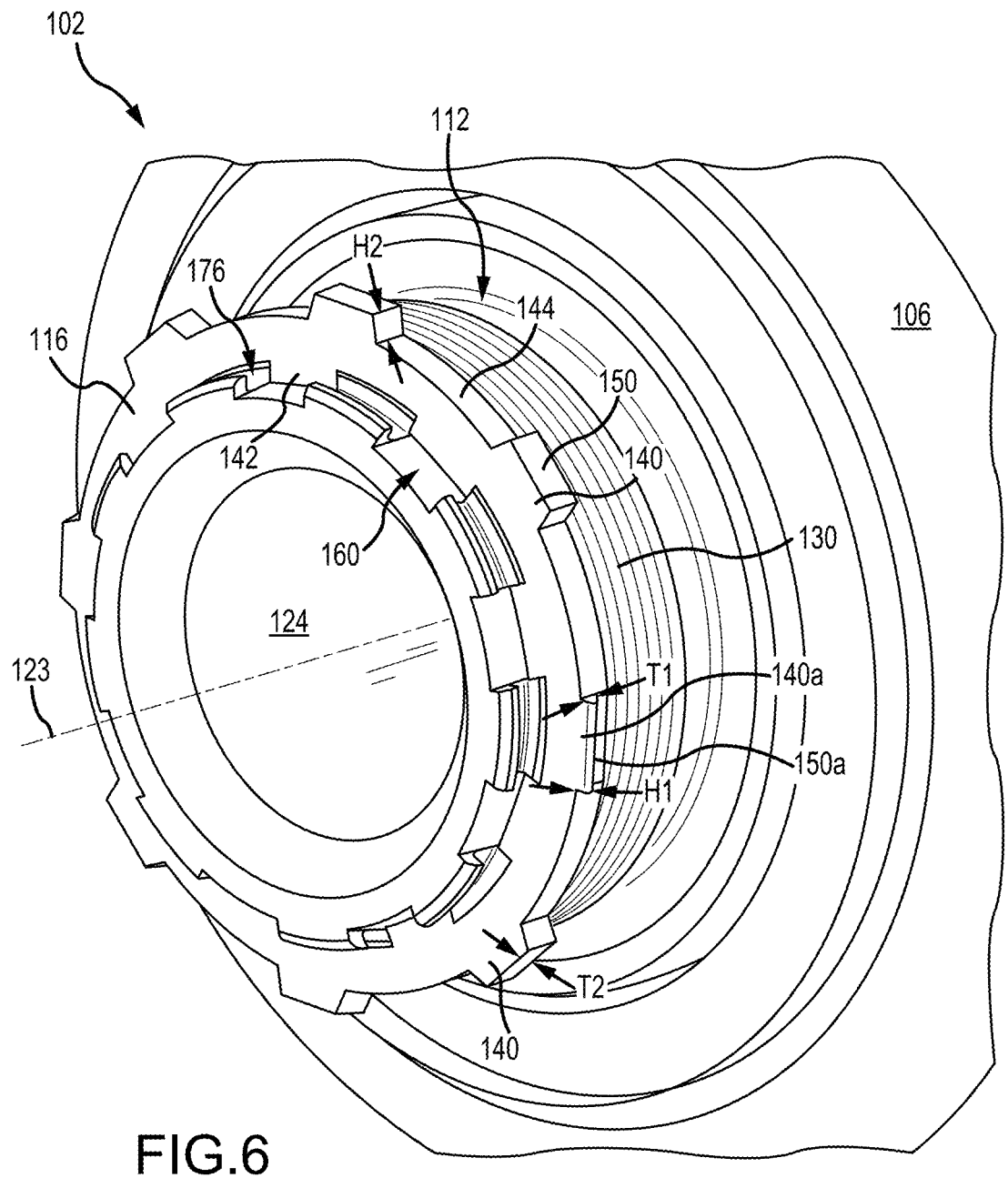
FIG. 6 illustrates a lock ring of a nut locking assembly coupled to a pin of the nut locking assembly, in accordance with various embodiments.

With reference to FIG. 6, lock ring 118 is shown coupled to pin 112. In accordance with various embodiments, pin 112 and lock ring 118 are configured such that, when lock ring 118 abuts and/or contacts axially oriented surface 174 (FIG. 5), at least a portion of retaining ring channel 176 is located axially between lock ring 118 and first end 122 of pin 112, thereby allowing retaining ring 120 (FIG. 4) to be located in retaining ring channel 176. With combined reference to FIGS. 4 and 6, retaining ring 120 is configured to block and/or restrict translation of lock ring 118. In various embodiments, retaining ring 120 may have a helical or coiled shape. Retaining ring channel 176 and retaining ring 120 may be configured such that locating retaining ring 120 in retaining ring channel 176 compresses retaining ring 120. In this regard, retaining ring 120 may generate and apply a biasing force, in an axial direction, against lock ring 118.

With combined reference to FIGS. 2, 3, and 4, when securing second landing gear component 104 to first landing gear component 102, pin 112 is inserted through second lug 108, second landing gear component 104, and first lug 106, until the head 125 of pin 112 contacts second lug 108. The axial length of pin 112 is selected such that when the head 125 of pin 112 contacts second lug 108, at least, a portion of OD threaded surface 130 will extend axially from first lug 106. Nut 116 may then be secured to pin 112 by threaded engagement between OD threaded surface 130 and ID threaded surface 132. Nut 116 is rotated about pin 112 until a desired torque or "preload" is achieved. Once the desired torque is achieved, nut 116 is rotated in the opposite direction until a position of nut grooves 138 relative to pin grooves 160 corresponds to a position of OD protrusions 140 relative ID protrusions 142. In other words, nut 116 is rotated until nut grooves 138 and pin grooves 160 are positioned or aligned in such manner that lock ring 118 can be inserted between nut 116 and pin 112. In various embodiments, upon achieving the desired torque or "preload," nut 116 may be further rotated in the same direction (i.e., in the direction which increases the preload) until the position of nut grooves 138 relative to pin grooves 160 corresponds to the position of OD protrusions 140 relative ID protrusions 142.

In accordance with various embodiments, the number of OD protrusions 140 and ID protrusions 142 on lock ring 118 may be selected based on a desired torque range, as the number of OD protrusions 140 and ID protrusions 142 on lock ring 118 is determinative of the number of degrees of nut 116 rotation between positions where nut grooves 138 and pin grooves 160 are aligned in a manner where lock ring 118 can be inserted between nut 116 and pin 112. For example, if lock ring 118 includes nine OD protrusions 140 and eight ID protrusions 142, then nut grooves 138 will be in a position relative to pin grooves 160 that can accept lock ring 118 every 5° of rotation of nut 116 about pin 112. If lock ring 118 includes five OD protrusions 140 and four ID protrusions 142, then every 18° of rotation of nut 116 about pin 112 nut grooves 138 will be in a position relative to pin grooves 160 that corresponds to the position of OD protrusions 140 relative to ID protrusions 142. In various embodiments, the number of OD protrusions 140 is different from the number of ID protrusions 142. In various embodiments, the number of OD protrusions 140 is at least one greater than the number of ID protrusions 142. Increasing the number of OD protrusions 140 and/or ID protrusions 142 decreases the number of degrees of nut 116 rotation between positions where the orientation of nut grooves 138 relative to pin grooves 160 corresponds to the position of OD protrusions 140 relative to ID protrusions 142 (i.e., between positions where lock ring 118 may be inserted between pin 112 and nut 116).

After lock ring 118 is inserted between nut 116 and pin 112, retaining ring 120 in inserted into retaining ring channel 176. Locating OD protrusions 140 in nut grooves 138 and ID protrusions 142 in pin grooves 160 blocks or restricts rotations of nut 116 relative to pin 112. Preventing, or limiting, rotation of nut 116 about pin 112 tends to allow nut locking assembly 110 to be employed in landing gear joints that experience increased axial loads.

Figure 7:
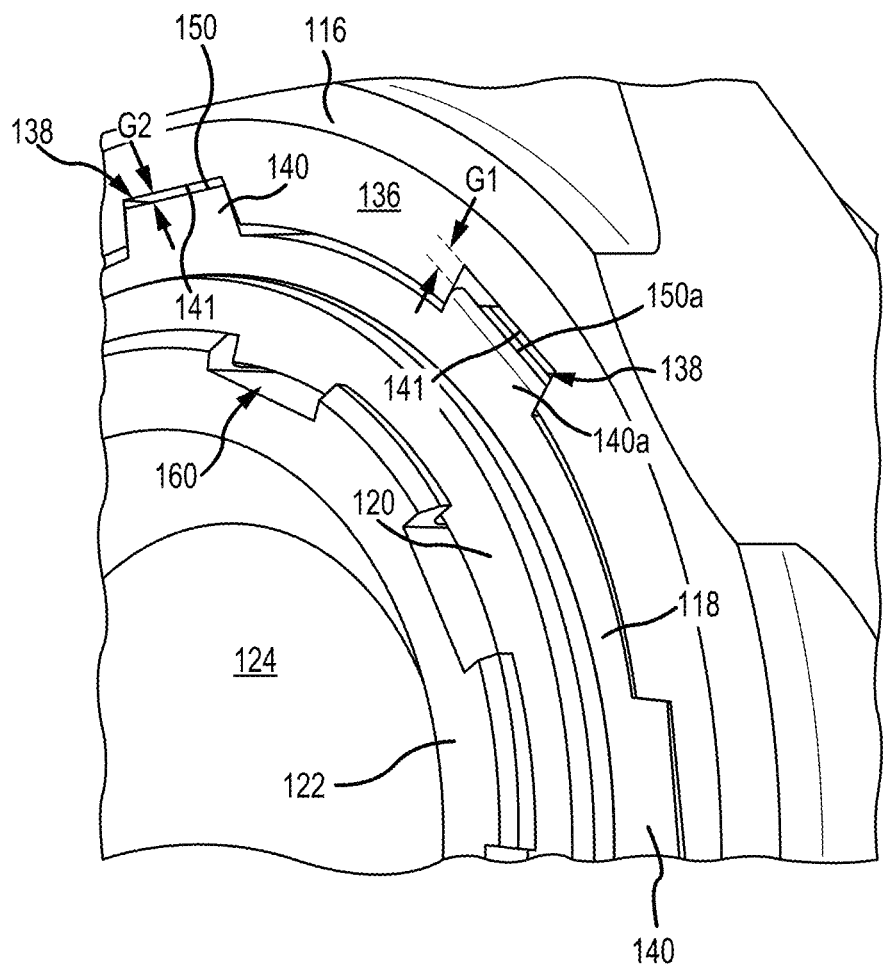
FIG. 7 illustrates a lock ring release gap located between a tooth of a lock ring and a nut of nut locking assembly, in accordance with various embodiments.

With combined reference to FIG. 6 and FIG. 7, in various embodiments, at least one of the OD protrusions 140 may be configured to facilitate removal of lock ring 118 from pin 112. For example, a radial height H1 of OD protrusion 140a may be less than the radial height H2 of the OD protrusions 140. Radial height H1 is measured between radially outward surface 150a of OD protrusion 140a and outer circumferential surface 144 of lock ring 118. Radial height H2 is measured between radially outward surface 150 of OD protrusions 140 and outer circumferential surface 144 of lock ring 118. The decreased radial height of OD protrusion 140a increases the radial length of the gap G1 between floor 141 of nut groove 138 and radially outward surface 150a of OD protrusion 140a, as compared to the radial length of the gap G2 between floor 141 of nut groove 138 and radially outward surface 150 of OD protrusions 140. In various embodiments, an axial thickness T1 of OD protrusion 140a may be less than the axial thickness T2 of the OD protrusions 140. The decreased axial thickness T1 of OD protrusion 140a and the increased gap G1 between radially outward surface 150a of OD protrusion 140a and floor 141 of nut groove 138 may allow a tool (e.g., a flat-head screwdriver) to be inserted into gap G1, after removal of retaining ring 120, to translate lock ring 118 axially away from axially oriented surface 174 (FIG. 5). In this regard, OD protrusion 140a may facilitate removal of lock ring 118 from between nut 116 and pin 112.

With reference to FIG. 2, nut locking assembly 110, and in particular the configuration of OD protrusions 140 and ID protrusions 142, tends to allow for more tailored preload torques (i.e., fewer degrees of rotation between locked positions) as compared to, for example, cross bolt nut assembly 200 of left landing gear assembly 12. For example, cross bolt nut assembly 200 may include a pin 202, a nut 204, cross bolt 206, a lock pin 208. The number of degrees of rotation of nut 204 between positions where cross bolt 206 may be inserted through nut 204 and pin 202 tends to be greater than the number of degrees of rotation between positions where lock ring 118 of nut locking assembly 110 may be inserted. While FIG. 2 shows left landing gear assembly 12 including nut locking assembly 110 and cross bolt nut assembly 200, it is further contemplate and understood that in various embodiments, cross bolt nut assembly 200 may be replaced by nut locking assembly 110. Replacing cross bolt nut assembly 200 with nut locking assembly 110 may allow for a pin having a shorter axial length as compared to pin 202 and/or for a nut having a shorter axial length as compared to nut 204, as pin 112 and nut 116 of nut locking assembly 110 do not need to accommodate a cross bolt. In this regard, nut locking assembly 110 may have a reduced weight and/or decreased axial length as compared to conventional nut assemblies having similar axial load capabilities. Nut locking assembly 110 may be employed to secure pins which experience increased axial loading, as lock ring 118 has significantly higher capability to resist relative torque between pin 112 and nut 116 due to the larger total shear area of the lock ring teeth (i.e., OD protrusions 140 and ID protrusions 142) versus that of cross bolt 206. In other words, the increased area of contact, or interference, between OD protrusions 140 and nut 116 and between ID protrusions 142 and pin 112, as compared to the area of contact between cross bolt 206 and pin 202 and cross bolt 206 and nut 204, increases the ability of lock ring 118 to resist relative torque between pin 112 and nut 116.

Figure 8A:
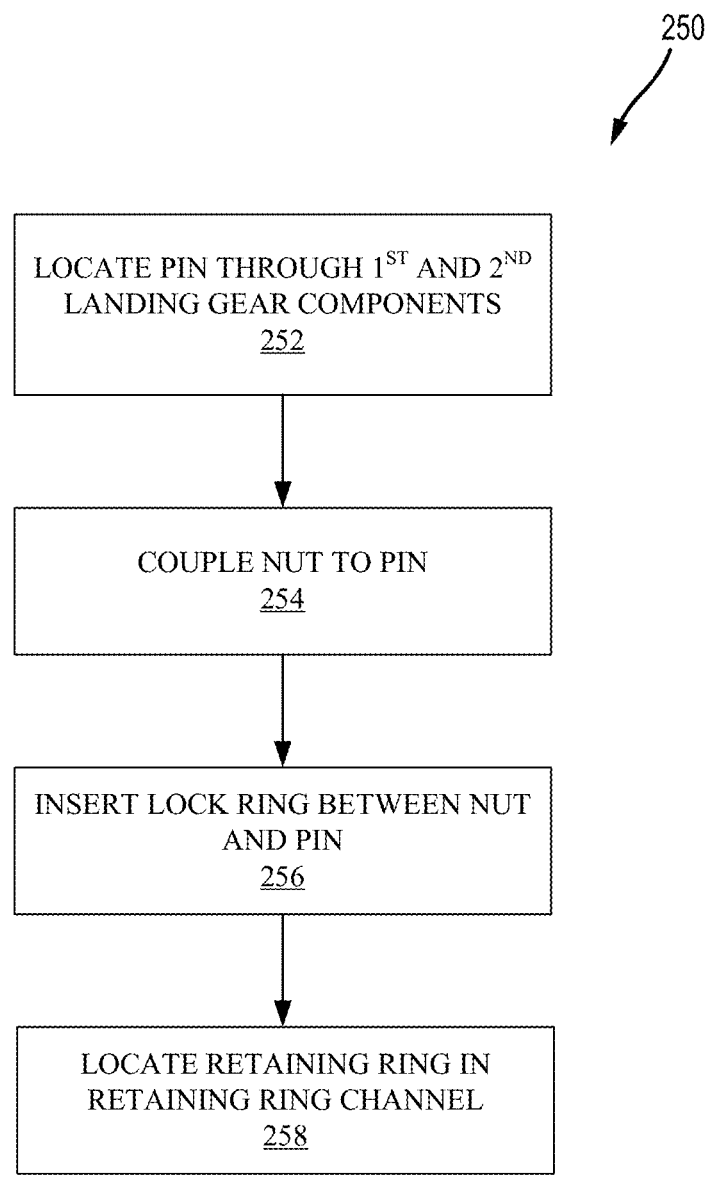
FIGS. 8A and 8B illustrate a method of coupling landing gear components, in accordance with various embodiments.

With reference to FIG. 8A, a method 250 of a coupling landing gear component is illustrated. In accordance with various embodiments, method 250 may comprising locating a pin through a first landing gear component and a second landing component (step 252) and coupling a nut to the pin (step 254).

Method 250 further includes inserting a lock ring between the nut and the pin (step 256) and locating a retaining ring in a retaining ring channel defined by the pin (step 258).

Figure 8B:
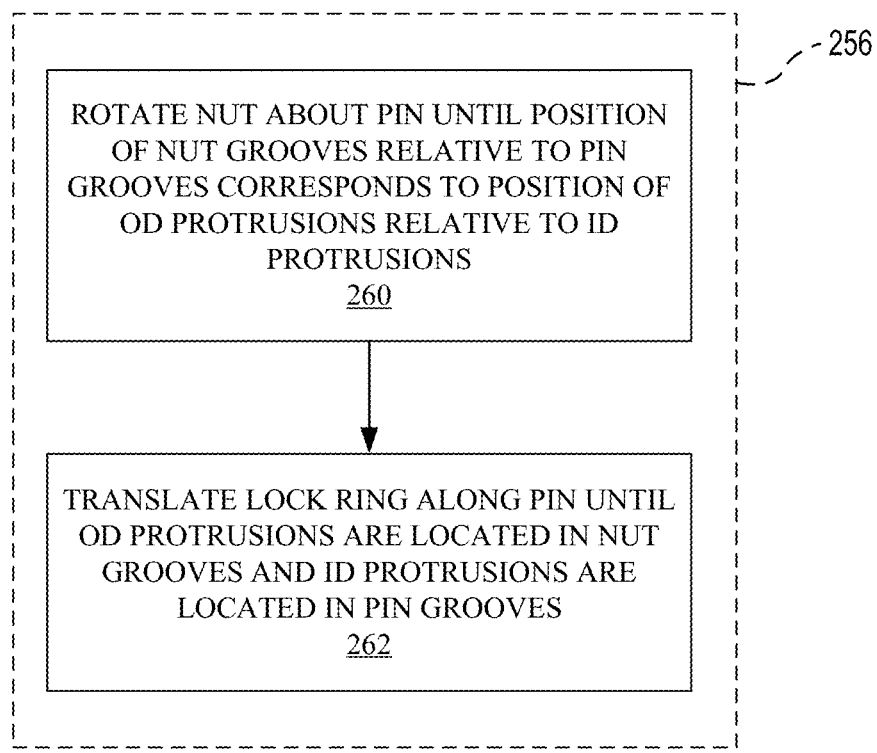

With reference to FIG. 8B, in various embodiments, step 256 may include rotating the nut about the pin until a positioning of the nut grooves relative to the pin grooves corresponds to a positioning of the OD protrusions relative to the ID protrusions (step 260), and translating the lock ring axially along the pin until the OD protrusions are located in the nut grooves and the ID protrusions are located in the pin grooves (step 262).

With combined reference to FIGS. 2, 4, and 8A, in various embodiments, step 252 may include locating pin 112 through first landing gear component 102 and second landing gear component 104 such that OD threaded surface 130 of the pin extends axially from first lug 106 of first landing gear component 102 and head 125 of pin 112 abuts second lug 108 of first landing gear component 102.

Step 254 may include coupling nut 116 to pin 112 by forming a threaded engagement between ID threaded surface 132 of nut 116 and OD threaded surface 130 of pin 112. Step 256 may include inserting lock ring 118 between nut 116 and pin 112. Step 258 may include locating retaining ring 120 in retaining ring channel 176 defined by pin 112.

With combined reference to FIGS. 2, 4, and 8B, in various embodiments, step 260 may include rotating nut 116 about pin 112 until a positioning of nut grooves 138 (i.e., radially outward extending grooves formed in nut 116) relative to pin grooves 160 (i.e., radially inward extending grooves formed in pin 112) corresponds to a positioning of OD protrusions 140 relative to ID protrusions 142. Step 262 may include translating lock ring 118 axially along pin 112 until OD protrusions 140 are located in nut grooves 138 and ID protrusions 142 are located in pin grooves 160.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A nut locking assembly, comprising:
    a pin including an outer diameter threaded surface and a plurality of radially inward extending grooves formed between the outer diameter threaded surface and an end of the pin;
    a nut including an inner diameter threaded surface and a plurality of radially outward extending grooves formed between the inner diameter threaded surface and an axial end of the nut; and
    a lock ring including a plurality of outer diameter protrusions and a plurality of inner diameter protrusions.

2. The nut locking assembly of claim 1, further comprising a retaining ring located between the lock ring and the end of the pin.

3. The nut locking assembly of claim 2, wherein the pin defines a retaining ring channel and the retaining ring is located in the retaining ring channel.

4. The nut locking assembly of claim 1, wherein each outer diameter protrusion of the plurality of outer diameter protrusions includes a radially outward surface and a side surface extending from the radially outward surface to an outer circumferential surface of the lock ring, and wherein an angle of the side surface relative to the radially outward surface is between approximately 90° and approximately 150°.

5. The nut locking assembly of claim 4, wherein the angle of the side surface relative to the radially outward surface is approximately 120°.

6. The nut locking assembly of claim 1, wherein a first gap between a radially outward surface of a first outer diameter protrusion of the lock ring and a floor of a first nut groove is greater than a second gap between a radially outward surface of a second outer diameter protrusion of the lock ring and a floor of a second nut groove, wherein the plurality of outer diameter protrusions includes the first outer diameter protrusion and the second outer diameter protrusion, and wherein the plurality of radially outward extending grooves includes the first nut groove and the second nut groove.

7. The nut locking assembly of claim 6, wherein an axial thickness of the first outer diameter protrusion is less than an axial thickness of the second outer diameter protrusion.

8. The nut locking assembly of claim 1, wherein the lock ring includes a greater number of outer diameter protrusions as compared to inner diameter protrusions.

9. A landing gear assembly, comprising:
    a first component including a lug;
    a second component coupled to the first component; and
    a nut locking assembly coupling the second component to the first component, the nut locking assembly comprising:
        a pin located through the lug and the second component, the pin including an outer diameter threaded surface and a plurality of radially inward extending grooves formed between the outer diameter threaded surface and an end of the pin;
        a nut including an inner diameter threaded surface engaged with the outer diameter threaded surface of the pin, wherein the nut defines a plurality of radially outward extending grooves formed between the inner diameter threaded surface and an axial end of the nut; and
        a lock ring located between the nut and the pin, the lock ring including a plurality of outer diameter protrusions and a plurality of inner diameter protrusions.

10. The landing gear assembly of claim 9, wherein the nut locking assembly further comprises a retaining ring located between the lock ring and the end of the pin.

11. The landing gear assembly of claim 10, wherein an outer circumferential surface of the pin defines a retaining ring channel, and wherein the retaining ring is located in the retaining ring channel.

12. The landing gear assembly of claim 11, wherein the retaining ring channel includes a first axially oriented wall and second axially oriented wall, the second axially oriented wall being oriented toward the first axially oriented wall, and wherein an axial thickness of the lock ring is greater than an axial length of the outer circumferential surface of the pin, the axial length of the outer circumferential surface being measured from the first axially oriented wall of the retaining ring channel.

13. The landing gear assembly of claim 9, wherein each outer diameter protrusion of the plurality of outer diameter protrusions includes a radially outward surface and a side surface extending from the radially outward surface to an outer circumferential surface of the lock ring, and wherein an angle of the side surface relative to the radially outward surface is approximately 120°.

14. The landing gear assembly of claim 9, wherein each inner diameter protrusion of the plurality of inner diameter protrusions includes a radially inward surface and a side surface extending from the radially inward surface to an inner circumferential surface of the lock ring, and wherein an angle of the side surface relative to the radially inward surface is approximately 120°.

15. The landing gear assembly of claim 9, wherein an axial thickness of a first outer diameter protrusion of the lock ring is less than an axial thickness of a second outer diameter protrusion of the lock ring, the plurality of outer diameter protrusions including the first outer diameter protrusion and the second outer diameter protrusion.

16. The landing gear assembly of claim 15, wherein a first gap between a radially outward surface of the first outer diameter protrusion and a floor of a first nut groove is greater than a second gap between a radially outward surface of the second outer diameter protrusion and a floor of a second nut groove, the plurality of radially outward extending grooves including the first nut groove and the second nut groove.

17. The landing gear assembly of claim 9, wherein the lock ring includes a greater number of outer diameter protrusions as compared to inner diameter protrusions.

18. The landing gear assembly of claim 9, wherein the second component pivots relative to the first component.

19. A method of coupling landing gear components, comprising:
locating a pin through a first landing gear component and a second landing component such that an outer diameter threaded surface of the pin extends axially from a first lug of the first landing gear component and a head of the pin abuts a second lug of the first landing gear component;
coupling a nut to the pin by forming a threaded engagement between an inner diameter threaded surface of the nut and the outer diameter threaded surface of the pin;
inserting a lock ring between the nut and the pin, the lock ring including a plurality of outer diameter protrusions and a plurality of inner diameter protrusions, the plurality of outer diameter protrusions being located in a plurality of radially outward extending grooves defined by the nut, the plurality of inner diameter protrusions being located in a plurality of radially inward extending grooves defined by the pin; and
locating a retaining ring in a retaining ring channel defined by the pin.

20. The method of claim 19, wherein inserting the lock ring between the nut and the pin comprises:
rotating the nut about the pin until a positioning of the plurality of radially outward extending grooves relative to the plurality of radially inward extending grooves corresponds to a positioning of the plurality of outer diameter protrusions relative to the plurality of inner diameter protrusions; and
translating the lock ring axially along the pin until the plurality of outer diameter protrusions are located in the radially outward extending grooves and the plurality of inner diameter protrusions are located in the radially inward extending grooves.

* * * * *